Patented Jan. 21, 1947

2,414,729

UNITED STATES PATENT OFFICE 2,414,729

PROCESS OF PREPARING A METALLIC PHENOLATE SALT OF A HYDROXYARYL-ALKYLAMINE PRODUCT

Charles L. Fleming, Jr., Roselle Park, and John G. McNab, Cranford, N. J., assignors to Standard Oil Development Company, a corporation of Delaware No Drawing. Application August 28, 1943, Serial No. 500,372

3 Claims. (Cl. 260—53)

This invention relates to the preparation of novel salts of amino compounds derived from substituted phenols by the introduction of an amino group into a side chain of such phenols, causing autocondensation of the product and neutralizing the composition thus formed with a base.

This application is a continuation-in-part of our copending application Serial Number 425,132 filed December 31, 1941.

The compositions herein described are particularly useful as additives for mineral lubricating oils used in internal combustion engines, in which they act as inhibitors of oxidation and deposition of varnish on hot metal surfaces and as agents for promoting engine cleanliness generally. They are also useful in lubricating compositions of high film strength for bearing and engine lubrication and in the preparation of improved extreme pressure lubricants for use especially for hypoid gears, in which the salts act as inhibitors of undesirable corrosion which is normally caused by the presence of materials containing chlorine, which are used alone or in combination with other materials effective in increasing the extreme pressure properties of the compounds, such as sulfur or phosphorus compounds.

The new salt compositions of the present invention may be regarded as salts of hydroxyaryl-alkyl amines which have been caused to undergo autocondensation whereby the products become oil soluble and exhibit more potent oxidation properties than the uncondensed compounds. Typical compounds are obtained by condensing an alkyl phenol with an aldehyde, e. g., formaldehyde, in the presence of hydrogen chloride, then reacting the resulting phenolic condensation product with ammonia or with an organic nitrogen base, heating the amino compound thus formed to liberate a portion of the nitrogen content of the same, and finally reacting the condensed amino compound with a suitable metallic base, such as barium hydroxide. The solubility of the amino compounds in hydrocarbon oils, as well as the solubility of the salts obtained from them, varies with the degree of condensation or resinification, and their solubility and effectiveness are readily increased by subjecting them to autocondensation conditions during their preparation, or by subjecting the simple amino reaction products to condensation treatment after they have been prepared. The increase in the oil solubility of the final products is desirable in that it makes possible the preparation of liquid concentrates containing relatively large proportions, such as 25% or more, of the improving agents of this invention dissolved in hydrocarbon oil, these concentrated solutions being conveniently used for blending purposes. It may be noted that the oil solubility of the products also increases with the length of the alkyl substituent in the aromatic nucleus.

The class of compounds which may be advantageously condensed and then reacted with a base in accordance with the present invention may be defined broadly by the formula

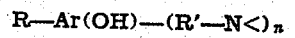

in which Ar is an aromatic nucleus, R is hydrogen or an organic radical, especially an alkyl, aryl or aralkyl radical which may in turn contain substituent groups, R' is an alkyl linkage such as

in which R'' represents either hydrogen or an alkyl or aryl group and may represent similar or different groups in the same molecule, and $n$ is a small whole number. The compounds most preferred as lubricating oil additives are also characterized by having at least 4 carbon atoms in the alkyl group joined to the aryl nucleus and/or to the nitrogen atom. The various substituent radicals may be attached at any position in the aryl nucleus and may be ortho, meta and/or para to the hydroxyl group and to each other. Especially useful are the resinous condensation products of materials having the characteristic structure

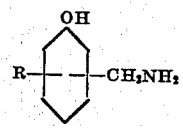

in which R is an alkyl group of at least 4 and preferably 5 to 20 or more carbon atoms.

The autocondensation of the hydroxyaryl amino compounds described above may be accomplished by heating. The extent of heating required varies with the composition of the particular amine being treated, some needing only 4 to 6 hours, but others requiring 15 to 20 hours of heating at a temperature of 110° to 120° C. In some cases the heating time is shortened by using higher temperatures. It has been found that when the amines are formed by first reacting a phenol with an aldehyde in the presence of hydrogen chloride, and then treating the reaction product with ammonia, the time required for heating the final product varies with the chlorine content of the intermediate and increases with increase in chlorine content. Products formed from intermediates containing from 10 to 15%, preferably 12 to 14%, of chlorine are much desired, as the condensed nitrogenous products formed from them are very effective lubricating oil improving agents. The condensation of the amines may be brought about not only by heating, but by standing at room temperature for a long period of time. Heating greatly hastens the autocondensation process, however. The heating may be carried out at atmospheric pressure or at higher pressures. It is often convenient to seal the compound in a bomb and conduct the heating under the pressure developed at 110° to 120° C. Whether the condensation is caused by heating or long standing, a characteristic change in the product is the elimination of substantial amounts of nitrogen, the quantities eliminated ranging from 10 to 75% of the original nitrogen content, depending upon conditions.

As stated above, the hydroxyarylalkylamines used to form the desired resinous products of the present invention may be readily prepared by reacting a phenol with an aldehyde in the presence of hydrogen chloride to form a hydroxybenzyl chloride or like product and then reacting this product with ammonia or with an amine. The reaction for the preparation of the chlorinated product goes with great ease, even though the original phenolic compound may contain a long chain aliphatic substituent group.

Below are given numerous examples of the preparation of the new compositions of the present invention. The tertiary octyl phenol used in these examples was prepared by alkylation of phenol with diisobutylene. This alkylated phenol has also often been referred to as diisobutyl phenol, isooctyl phenol or tetramethylbutyl phenol.

*Example 1*

900 grams of paraformaldehyde (30 mols of formaldehyde) and 5000 grams of concentrated hydrochloric acid were placed in a 12-liter flask provided with a stirrer, a reflux condenser and a thermometer. A solution of 2060 grams (10 mols) of p-tert.-octyl phenol in an equal weight of benzene was then added to the flask over a period of 20 to 25 minutes, while passing dry hydrogen chloride gas continuously through the solution during the entire reaction in order to keep the mixture saturated with hydrogen chloride. The stirrer was also operated continuously to provide efficient contact between the two liquid phases during the reaction. The temperature of the initial mixture of paraformaldehyde and hydrogen chloride was 15° C. It increased to 45-50° C. upon addition of the phenol and this temperature was thereafter maintained for 1½ hours while constantly stirring and passing in hydrogen chloride gas. At the end of this time, after the the stirring was stopped, an upper phenolic benzene layer separated from a lower fuming hydrochloric acid layer and was separately withdrawn from the reaction vessel. A portion of the upper layer, after washing and removal of the benzene, yielded a viscous light red oil, crystallizing partly on standing. Analysis of a small sample of this oil indicated it to contain 14.2% chlorine.

To 600 grams of the above benzene solution there were slowly added (with thorough stirring) 50 grams of anhydrous ammonia dissolved in 300 grams of 98% isopropyl alcohol. Since this reaction takes place with great evolution of heat, cooling or pressure is advisable to prevent loss of solvent and ammonia, especially in large scale preparations. After complete addition of the ammonia, the mixture consisted of a thick, tacky, yellow slurry containing an excess (about 10%) of ammonia. The mixture was then placed in a stainless steel bomb of one liter capacity, which was sealed and then heated for 20 hours at a temperature of 110 to 120° C.

After heating, the reaction product was obtained as a material completely soluble in the benzene-alcohol solvent present which also contained a fine suspension of insoluble ammonium chloride. This mixture was washed with water several times to remove both the alcohol and the suspended salt. 500 grams of a refined paraffinic lubricating oil, having a viscosity Saybolt at 210° F. of 43 seconds, were added and the mixture was blown with nitrogen at 120° to 130° C. for two hours to remove the benzene. After this, more oil was added to provide a concentrate of relatively low viscosity and clear red color containing 25% of the reaction product.

A small portion of the benzene solution was withdrawn for analysis prior to addition of the lubricating oil. Evaporation of the benzene produced a brittle, resinous material containing 2.8% nitrogen.

The chlorine content of the intermediate product may be controlled by the ratio of the formaldehyde and phenol used in the initial reaction. For example, when conducting the process as described in Example 1 with several different proportions of formaldehyde and tert.-octyl phenol, the chlorine content of the intermediate product and the nitrogen content of the final product were observed to be as follows:

| Molal ratio of formaldehyde to octyl phenol | Intermediate product per cent Cl | Final product per cent N |
|---|---|---|
| 1.0 | 2.7 | 0.5 |
| 1.5 | 8.7 | 1.7 |
| 2.0 | 11.9 | 2.4 |
| 2.5 | 13.5 | 2.9 |
| 3.0 (Example 1) | 14.2 | 2.8 |

Instead of removing the suspended ammonium chloride from the heat treated reaction product by water washing as described in Example 1, the salt may be removed by filtration, preferably by filter pressing the suspension with the addition of a filter aid such as Hyflo. A suitable lubricating oil may then be added to the filtrate (if it is desired to produce directly an oil solution of the final product), and the alcohol-benzene solvent may then be removed by distillation.

Although a very satisfactory procedure for preparing the resinous product has been described with reference to the condensation of a nitrogen base with a condensation product of an alkyl phenol, formaldehyde and hydrogen chloride, and further condensation or polymerization of the resulting product, it is to be understood that other procedures may be employed for obtaining oil blending agents of similar character. However, the described method is preferred. In these procedures the order of the reaction steps may be changed and other similar reactants may be used. For example, the formaldehyde or other aldehyde may be first reacted with ammonia, or with a primary, secondary or tertiary amine, to form alkyl-alkylol amines for condensation with a phenol or an alkyl phenol; or it may be desired to alkylate the base or the base derivatives of the phenol condensation product, e. g., with an alkylating agent such as diethyl sulfate, an alkyl halide, an alcohol, ketone or olefin, by known alkylating methods, and with subsequent reduction by hydrogen, if needed or desired.

As in the case of many resin preparations, the exact mechanism of the reaction is not entirely understood. In the first stage the alkyl phenol may be regarded as condensing with the reaction product of the hydrogen halide and aldehyde, or as condensing with formaldehyde, the condensation product thereof being condensed with the hydrogen halide. The resulting product of this reaction is a complex mixture of various chlormethyl derivatives having the following general formula:

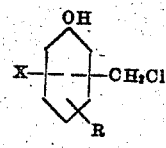

in which the substituent groups may be attached to any position of the aryl nucleus indicated diagrammatically by the hexagon, R representing a hydrocarbon group of at least 2, and preferably an alkyl group of 4 or more, carbon atoms, and X representing hydrogen or an organic radical, especially an alkyl, aryl or aralkyl radical which may in turn contain substituent groups. Among the compounds which have been identified as present in the products from such reaction are the following:

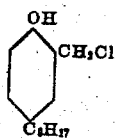

chlormethyl tert.-octyl phenol

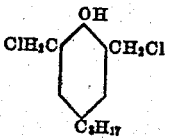

di(chlormethyl) tert.-octyl phenol

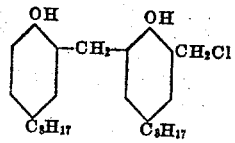

chlormethyl bis (tert.-octyl hydroxy phenyl) methane and

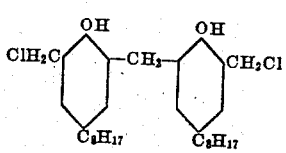

bis(tert.-octyl chlormethyl hydroxy phenyl) methane

In the second stage of reaction, the condensation products of the alkyl phenol, formaldehyde and hydrogen halide split off halogen in undergoing a further condensation with the nitrogen base, and thus the alkyl phenol radical becomes united with the base radical through the methylene (—$CH_2$—) group, thereby forming compounds containing the following characteristic group:

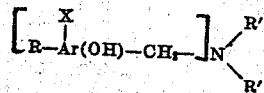

wherein, as before, R—Ar(OH)— represents the alkyl phenol group, X represents H or an organic group and the nitrogen atom N has valences which may be satisfied by hydrogen or organic radicals (R'), which may represent an alkyl, cycloalkyl, aryl, or hydroxy alkyl benzyl radical, and which may represent similar or different radicals in the molecule, as, for example, in the following types of compounds:

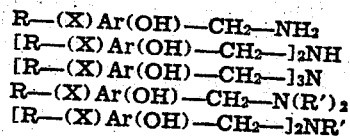

In a further variation of the method for producing the amino compounds used in accordance with this invention the hydrogen chloride and formaldehyde may first be reacted to form chlormethyl ethers such as $ClCH_2OCH_2Cl$ and $ClCH_2(OCH_2)_nOCH_2Cl$, in which $n$ is an integer, and these chlorethers may be caused to react with the phenol. This may be done by passing dry hydrogen chloride through a suspension of paraformaldehyde in a solvent such as benzene until most of the formaldehyde has reacted with the hydrogen chloride to give a soluble reaction product. The entire reaction mixture is then mixed with an alkyl phenol to give an alkylated hydroxy benzyl chloride or condensation products of the same, the reagents being used preferably in a ratio of about 2.5 mol equivalents of formaldehyde per mol of phenol. This intermediate is reacted with ammonia and heated as in Example 1 to give an oil-soluble product. The chlormethyl ether may also be prepared by any other suitable method and the mixed ether products may be fractionated to separate pure ethers, any one of which may be reacted with the phenol. The phenol may also be added to the formaldehyde-benzene mixture and dry hydrogen chloride passed through this mixture to obtain the desired product in a single stage reaction. This product is reacted with ammonia and heated as before to give the lubricating oil additive.

The reaction of hydrogen chloride and formaldehyde may also be conducted in the presence of an alcohol, for example, methyl alcohol, to give an alpha chlorether. This may be done by passing dry hydrogen chloride into a suspension of paraformaldehyde in the alcohol. This ether may then be reacted with the alkyl phenol by heating with or without a catalyst, such as zinc chloride, to give the alkyl hydroxy benzyl chloride, the original alcohol being regenerated as a by-product.

Also, the alkyl phenol may be converted to the sodium salt and this salt, with no excess of alkali present, may then be caused to react with an aldehyde to give an alkylol derivative. This may be converted to the chloride by reaction with hydrogen chloride. Either the alkylol derivative or a resulting halide derivative may then be reacted with ammonia and heated as in Example 1 to give an oil-soluble product. This is illustrated in the following example.

Example 2

One molecular proportion each of tert.-octyl phenol (tetramethyl butyl phenol) and of sodium hydroxide are dissolved in water containing sufficient alcohol to dissolve the resulting sodium phenolate. The use of about 2 volumes of water and ⅔ volume of methyl alcohol per volume of phenol is sufficient for this purpose. Three molecular proportions of formaldehyde (in the form of formalin containing 37% $CH_2O$) are added to this solution and the mixture allowed to stand for about 48 hours at room temperature, the reaction leading to the formation of the dimethylol derivative. The reaction mixture is then neutralized with acetic acid or any suitable mineral acid and the liberated di(hydroxymethyl) tert.-octyl phenol separates as an upper layer and may be used directly as such or after purification. To form the dichloride, the di(hydroxymethyl) tert.-octyl phenol may be contacted with concentrated aqueous hydrochloric acid, or with dry hydrogen chloride. In the latter instance the hydrogen chloride may be passed through a solution of the compound in a suitable solvent such as benzene, carbon tetrachloride, chloroform, etc.

The reaction with ammonia may be carried out by adding an excess of ammonia, dissolved in isopropyl alcohol, to a solution of the hydroxy methyl tert.-octyl phenol or of the corresponding chloride in a solvent such as benzene. This reaction with ammonia is quite violent at first and is conducted in the same manner as described in Example 1. When the addition of ammonia is completed, the reaction mixture is sealed in a bomb and heated at 110° to 120° C. for about 18 to 24 hours. The mixture is subsequently washed with water to remove isopropyl alcohol an ammonium chloride and the benzene solvent is then evaporated to recover the complex reaction product as a brittle solid resin which is soluble in lubricating oils. Because of its resinous nature, the rate of solution of the product in oil may be slow, particularly in base stocks of high viscosity index. To facilitate solution in such oils it is advisable to heat them to above 60–70° C. when preparing blends of the addition agent. This procedure may also be used to prepare concentrates containing as much as 25 to 75% of the material, the concentrates later being mixed with additional base stock to give finished blends of the desired concentration.

It is possible to conduct the reaction of the phenol, formaldehyde and ammonia directly in a single stage by placing a mixture of suitable proportions of these reagents in a bomb and heating it, for example, at 110° to 140° C. for about 15 to 20 hours. The proportions of reagents are preferably similar to those used in the process described above, at least a mol equivalent of formaldehyde and ammonia being used per mol of phenol. The ammonia is preferably in excess, some remaining at the end of the reaction. This is illustrated in the following example.

Example 3

A stainless steel bomb was charged with 51.5 grams of p-tert,-octyl phenol. Then 20 grams of 37% strength aqueous formaldehyde and 25 cc. of concentrated aqueous ammonia were added and the bomb was quickly sealed. The bomb was heated to 120° C. and held at this temperature for 16 hours, after which it was cooled and opened and the reaction mixture poured into water. The product was extracted with ether, and the ether extract was washed free of ammonia and subsequently dried over sodium sulfate. After the ether was removed by evaporation, there remained 50.5 grams of a soft red resin which contained 1.3% nitrogen.

Another example, showing a somewhat varied procedure is as follows:

Example 4

A stainless steel bomb was charged with 150 cc. of absolute ethyl alcohol and 7.5 grams of trioxymethylene. The solution was then saturated with ammonia gas at 0° C., the trioxymethylene being dissolved during the process of saturation. 17.5 grams of ammonia were absorbed, 55.5 grams of tert.-octyl phenol were then added, and the bomb was quickly closed and heated at 110° C. for 20 hours. The bomb was then cooled, opened, and the reaction mixture poured into water and extracted with ether. The ether extract was washed free of ammonia with water and then dried over sodium sulfate. Evaporation of the ether yielded 62 grams of a soft light colored resin, which upon analysis was found to contain 2.52% nitrogen. Upon heating this material at 200° C. for one-half hour under 3 mm. absolute pressure and then cooling, a brittle resin was obtained which had a nitrogen content of 0.56%. A portion of this material was then blended in 0.1% concentration with a turbine oil which normally caused heavy corrosion in a turbine oil corrosion test. The blend showed only very slight corrosion in this test and in fact this additive was found to be substantially as effective as the best anti-corrodants known.

As a variation of these processes, hexamethylenetetramine may be used in place of a mixture of formaldehyde and ammonia, and may be reacted by heating with the phenol, with or without a solvent.

Primary and secondary amines and substituted amines, such as diethyl amines, diamyl amines, piperidine, aniline, diphenyl amine, and substituted amines, such as ethanolamine and the like, may be substituted for the ammonia in any of the above described processes to prepare similar condensation products. These upon heating also undergo condensation and polymerization.

Similarly, more complex derivatives of hydroxy benzyl chloride may be prepared by any suitable methods and may be reacted with ammonia or a primary or secondary amine and heated to secure resinous condensation and polymerization products suitable for use in preparing the salts of the present invention. Examples of such hydroxy benzyl chlorides are

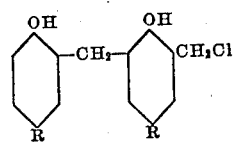

and

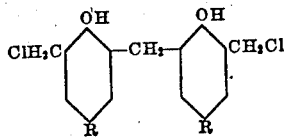

Hydroxy benzylamines, such as those having the characteristic structure

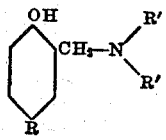

may also be heated to produce resinous autocondensation products suitable for use in forming the salts of this invention. In the above formulas the substituents may be linked to any position of the aryl nucleus, and the radicals R and R' have the same significance as in the formulas previously described. This is illustrated by the following example:

Example 5

Diethyl amino methyl-tert.-octyl phenol, $(C_2H_5)_2NCH_2.C_8H_{17}C_6H_3OH$, was prepared by reaction of equimolal amounts of ethoxy methyl diethyl amine, $(C_2H_5)_2NCH_2OC_2H_5$, with tert.-octyl phenol at the temperature of the steam bath for 24 hours. The product was distilled under 3 mm. mercury absolute pressure, yielding a clear liquid distillate fraction at 163° to 165° C. and a residue which was a yellow, transparent, hard resin. This resin was found to be active as an anti-corrodant in a turbine oil corrosion test, although it was not quite as effective as the products of Examples 3 and 4.

Then phenols used in any of the above described processes include generally all nuclearly hydroxylated aromatic compounds having phenolic properties and a readily replaceable nuclear hydrogen atom which is preferably either ortho or para to the hydroxyl group. Phenols extracted from petroleum oils may also be used as obtained or after alkylation. Also, other naturally occurring phenols may be used, such as those having a vegetable origin, for example, cardanol, obtained from cashew nut shells. As indicated above, it is preferred that the phenols contain an alkyl group of at least 2, and preferably 4 or more, carbon atoms attached to the nucleus. This may be accomplished by alkylating any of the above-described phenols which do not already contain suitable alkyl groups. The alkyl phenols may be prepared by alkylation of phenols with olefins, including mixtures of olefins such as those obtained in cracked petroleum fractions, and by alkylation of phenols with alkyl halides, including chlorinated paraffin wax and chlorinated petrolatums derived from petroleum. Such chlorinated waxes may contain dichlorides and polychlorides and may be used in alkylating phenols by the customary Friedel-Crafts type of synthesis to give complex alkylated phenols of high molecular weight in which several phenol groups are linked by alkyl radicals in a single molecule. These high molecular weight complex alkyl phenolic products, when reacted with an aldehyde and a nitrogen base as described herein, give products which are effective in reducing the pour point of waxy oils and in raising the viscosity index of lubricating oils as well as in improving their lubricating properties, such as film strength, and their stability and resistance to oxidation.

In addition to the phenols, other hydroxy aromatic compounds may be employed in forming the hydroxyarylalkyl amines. For example, alkylated phenol sulfides or disulfides may be employed. These may be reacted with formaldehyde and hydrogen chloride or with chlormethyl ethers to form chlorinated products of the type

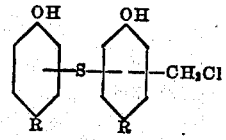

or

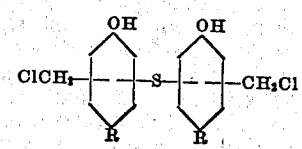

in which R is preferably an alkyl radical. The products may be reacted with ammonia or amines and resinified in accordance with the present invention.

Other hydroxy aromatic compounds may also be used in a similar manner, such as naphthols, hydroxy biphenyl, thymol, etc.

The foregoing description has related to methods of preparing the resinous autocondensation products of hydroxyarylalkyl amines. The metallic salts of these products may be readily prepared by reacting the products with metallic bases, alcoholates, etc. For example, the octyl phenol-formaldehyde-hydrogen chloride-ammonia product of Example 1 may be reacted with barium hydroxide by heating with a dispersion of the latter in mineral oil or benzene to form a barium salt in which the metal replaces hydrogen of a hydroxy group. The same material may be reacted with an alcoholate, such as magnesium methylate or ethylate; or it may be reacted with an alkali, and the alkali salt so formed may be converted into other metallic salts by double decomposition, as in reacting with a salt of another metal. Chlorides of polyvalent metals, such as magnesium, zinc and the like, work satisfactorily in the double decomposition, which is preferably conducted in absolute alcohol as the reaction medium. In preparing barium salts by this method, barium bromide will be found to be a more satisfactory reagent than the chloride because of its better solubility in alcohol. In general, about 5 to 10% excess metal hydroxide over the amount theoretically required will be sufficient for conversion of the condensation products to their metal salts, but greater excesses than this may be necessary depending on reaction conditions and the particular products being handled.

Although in the preferred method of the present invention autocondensation of the hydroxyarylalkyl amines is first effected before conversion to the metal salts, it may be found desirable in some instances to form the metal salt of the hydroxyarylalkyl amine before bringing about autocondensation.

The onium salts of the resinous products of hydroxyarylalkyl amines may be prepared by reacting a halide of an onium base, e. g., a tetraalkyl ammonium chloride, a sulfonium chloride, or the like, with an alkali metal salt of the resinous hydroxyarylalkyl amine, preferably in an alcoholic solution. The alkali halide formed in the reaction is insoluble and may be conveniently removed.

The preparation of the salts from the compounds containing free hydroxy groups is illustrated by the following example of the preparation of a barium salt:

Example 6

145 grams of the ammonia derivative of chloromethyl tert.-octyl phenol, prepared, for example, by the method shown in Example 1, and 145 grams of C. P. benzene were refluxed with 215 grams of Ba(OH)₂.8H₂O for 60 hours, water being removed from the reaction through a trap in the reflux condenser. The mixture was filtered to give an approximately 50% solution of the barium salt in benzene. Analysis showed the product, on a benzene-free basis, to contain 11.13% of barium. A product containing 10.87% barium on a solvent-free basis may, however, be obtained by refluxing the mixture for only 8 hours. The product on complete removal of the solvent was a brown powdery mass.

The invention thus contemplates the preparation of salts of high molecular weight resinous autocondensation products of hydroxyarylalkyl amines containing the characteristic structure—

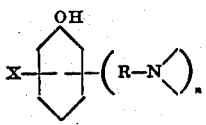

in which R is an alkyl linkage such as

in which R' represents either H or alkyl or aryl groups or substituted alkyl or aryl groups and may represent similar or different groups in the same molecule, n represents a small whole number and X represents hydrogen or one or more organic radicals attached to the aryl nucleus, especially an alkyl, aryl or aralkyl radical which may in turn contain substituent groups, such as a hydroxy alkyl benzyl radical. The desired compounds are also characterized by having at least four carbon atoms in alkyl groups joined to the aryl nucleus and/or to the amine radical (N=) and are further characterized in having undergone an autocondensation reaction to produce a resinous, viscous liquid to solid product of high molecular weight which is soluble in hydrocarbon oils. In this, as in all the other structural formulae given in this application, the location of the substituent radicals in regard to the aryl nucleus is given merely as an illustration, and the various substituent radicals may be attached to any positions of the aryl nucleus, ortho, meta and/or para to the hyroxyl group and to each other. The most useful compounds of this invention come within the above definition and are salts of resinous autocondensation products of materials having the characteristic structure

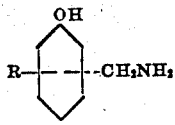

in which R is an alkyl group of at least 4 and preferably 5 to 20 or more carbon atoms, the compounds having undergone an autocondensation reaction as described above. Although the alkali and alkaline earth metal salts of the resinous autocondensation products of these compounds are especially useful, other divalent metal salts, such as the salts of zinc, copper and lead, should be particularly mentioned. The barium salts are exceptionally effective as lubricating oil additives. In place of the metallic salts the corresponding salts containing basic radicals instead of metals, such as the onium salts, e. g., the ammonium, alkylammonium, sulfonium, phosphonium and pyridonium salts, may also be used to advantage.

A detailed procedure for conducting a small scale commercial preparation of a typical new composition of the present invention will be described in the example which follows. In this example paraformaldehyde is reacted with hydrogen chloride, the product is reacted with tert.-octyl phenol and the product thereby formed is further reacted with ammonia, and the amino compound thus produced is finally converted into the barium salt.

Example 7

2060 grams of 100% commercial grade benzene (the weight being equal to that of 10 mols of tert.-octyl phenol) and 750 grams (25 mols) of paraformaldehyde are introduced into a nickel agitator and the stirrer started. Dry hydrogen chloride gas is introduced through a tube extending to the bottom of the reactor, with perforations near the lower end of the tube. The gas is passed out through a wash bottle containing a liquid hydrocarbon such as benzol or a petroleum fraction in order to observe the rate of flow, and thus to a fume hood, maintaining the reactor at atmospheric pressure. After the air is expelled, the gas is passed in slightly faster than it can be absorbed in order to hydrohalogenate as rapidly as possible, maintaining the temperature at about 20° to 30° C. by circulating water through the jacket. After one hour the gas flow is stopped. 2060 grams (10 mols) of tert.-octyl phenol which have been melted by means of a steam coil are added to the same reactor, or to another reaction vessel to which the entire product has been transferred, through a dropping funnel or other suitable means, as rapidly as possible, holding the temperature in the reaction below 50° C. The flow of hydrogen chloride gas is resumed immediately at a rate just slightly faster than it is absorbed, maintaining atmospheric pressure and a temperature of approximately 50° C., for 2½ hours.

The introduction of hydrogen chloride is then discontinued and the mixture allowed to stand several hours, and dry ammonia gas is introduced under pressure through the tube extending to the bottom of the same reactor or of another reactor containing the product of the preceding reaction, and stirring is continued. When the ammonia is initially introduced, the outlet valve of the reactor is opened slightly so that any air present will be swept out by the incoming ammonia. During this step the gas pressure in the reactor is maintained at about 20 lbs./sq. in. When an atmosphere of substantially pure ammonia has been obtained, the outlet valve is closed and the pressure allowed to rise to from 25 to 50 lbs., where it is maintained for about 18 hours. The temperature is held at a maximum of 110° C. by circulating water, then steam, through the jacket.

After ammonation is complete, the ammonia pressure is slowly released until atmospheric pressure is reached, and the product is removed from the reactor. The solid ammonium chloride which has formed is removed by filtration and the benzene solution is washed rapidly with water until the washings are substantially free of chlorides. The washing may be carried out in the reactor, but if this is done the latter should preferably be provided with a cone bottom. If the product is to be used as such in a lubricating oil or converted to a salt in oil solution, the required amount of oil may be added to the benzene solution, and the benzene and any residual water may then be removed under vacuum. In this manner, oil solutions containing 25 to 75% of the product may be obtained, although for convenience in handling, concentrates having 40 to 60% of additive are most often preferred.

If in the preparation of the chlormethyl phenol an aqueous layer is formed, the latter may be discarded. If emulsification occurs, the emulsion layer may be separated from the benzene layer and the emulsion broken by treatment with live steam until the benzene begins to boil. On standing for an hour or more, a separation of the aqueous and benzene layers will occur. The separated benzene layer may then be returned to the reactor.

The conversion of the product to a metal salt may be carried out in the above benzene solution, or, more preferably, in a mineral oil solution. Thus, to prepare the barium salt 4000 grams of a 50% mineral oil solution of the condensation product obtained as described above are placed in a suitable reaction vessel and heated to 120–130° C. Then 1600 grams of $Ba(OH)_2 \cdot 8H_2O$ are added gradually with stirring over a 1 to 2 hour period and heating continued for about 30 minutes, after which the product is filtered to give a finished lubricating oil concentrate of the metal salt.

To minimize foaming during the neutralization it is desirable to have present a foam suppressor such as a higher aliphatic alcohol. In a 50% mineral oil concentrate addition of about 3 to 15% of stearyl or cetyl alcohol will greately minimize foaming and will also facilitate the subsequent filtering operation.

It is not intended that the invention be limited by any of the particular examples, which have been presented only for the purpose of illustration, but solely by the terms of the appended claims.

We claim:

1. The process of preparing a metallic phenolate salt of an oil-soluble hydroxyarylalkyl amine product which comprises reacting 2 to 3 molecular proportions of formaldehyde with 1 molecular proportion of tert.-octyl phenol in the presence of hydrogen chloride in proportions to form a product containing 10 to 15% of chlorine, reacting the latter with a sufficient quantity of ammonia to replace each atom of chlorine with an amino group, resinifying the product by means of auto-condensation, and further reacting the resinified product with a metallic base.

2. The process of preparing a metallic phenolate salt of an oil-soluble hydroxyarylalkyl amine product which comprises reacting two to three molecular proportions of formaldehyde with one molecular proportion of an alkyl phenol having an alkyl group of 4 to 20 carbon atoms and at least one unsubstituted nuclear hydrogen atom in the presence of hydrogen chloride in proportions to form a product containing 10 to 15% of chlorine, reacting the latter with a sufficient quantity of ammonia to replace each atom of chlorine with an amino group, resinifying the product by means of autocondensation, and further reacting the resinified product with a metallic base.

3. A process according to claim 2 in which the metallic base is barium hydroxide.

CHARLES L. FLEMING, Jr.
JOHN G. McNAB.